UNITED STATES PATENT OFFICE.

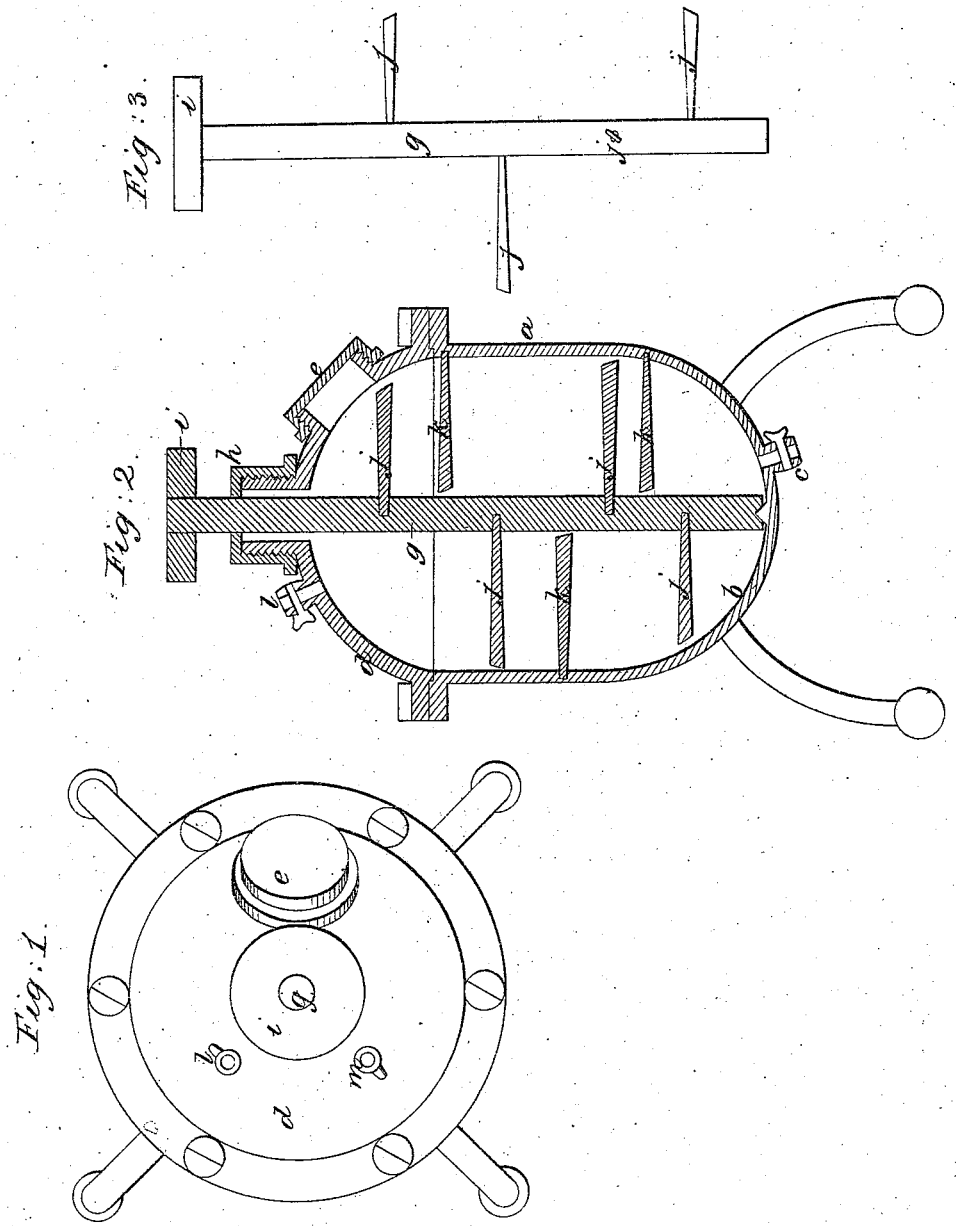

JAMES PERRY AND ELISHA FITZGERALD, OF NEW YORK, N. Y., ASSIGNORS TO JAS. PERRY, DANL. FITZGERALD, AND HORATIO BOGERT, OF SAME PLACE.

RAISING DOUGH.

Specification of Letters Patent No. 19,610, dated March 9, 1858.

*To all whom it may concern:*

Be it known that we, JAMES PERRY and ELISHA FITZGERALD, both of the city, county, and State of New York, have invented a certain new and useful Improvement in the Process of Preparing and Raising or Leavening Dough or Paste for Making Bread, Cakes, Pastry, &c.; and we do hereby declare that the following is a full, clear, and exact description thereof, reference being had to the accompanying drawings, making part of this specification, in which—

Figure 1 is a plan of the machine employed in the working of the process; Fig. 2 a vertical section thereof and Fig. 3 a separate view of the central shaft and blades or arms.

The same letters indicate like parts in all the figures.

The object of our invention is to prepare dough or paste in such a way that in the process of preparing and baking it will be raised or leavened without the necessity of mixing therewith chemical agents, the presence or consequences of which are deleterious; and to this end our said invention consists in mixing the dough in a closed vessel under gaseous pressure; and our said invention also consists in discharging the dough or paste which has been mixed under gaseous pressure from the vessel in which it was so mixed by the pressure of the gas so that it can be taken in quantities of the required size directly from the discharge to the oven or other cooking apparatus.

In the accompanying drawing (*a*) represents a vertical vessel with a closed bottom (*b*) provided with a discharge pipe (*c*) having a cock or valve. The said vessel is made in two parts the upper part (*d*) being connected with the lower part by a suitable packed joint or in any other suitable manner to make it air tight. The upper part is provided with a large aperture covered with a cap (*e*) through which the charge can be introduced. Within this vessel there is a vertical rotating shaft (*g*) turning on a pivot at bottom and formed with a journal at top that passes through a stuffing box (*h*) in the head or top (*d*) that it may carry a pulley (*i*) at its upper end and outside of the vessel by which motion may be imparted.

Radial blades or arms (*j*) project from different parts of the length of the shaft and of such length as just to clear the surface of the vessel (*a*). The faces of the blades are from the shaft outward oblique to the plane of motion so that thin under surfaces shall act on the dough to gradually force it downward toward the bottom of the vessel as the shaft rotates and there are corresponding blades or arms (*k*) projecting inward from the inner surface of the vessel (*a*) and extending to within a short distance of the surface of the shaft and so located that the blades on the shaft pass between them.

The vessel is provided with a receiving cock (*l*) and an exhaust cock (*m*) at the top as seen in Fig. 1—one of which is to be connected by suitable pipes with a gasometer or other apparatus containing carbonic acid gas under high pressure, which said apparatus may be such as is used for soda water and therefore does not require to be described or represented. The other cock (*m*) is to be connected with any suitable apparatus for exhausting the vessel with air.

For working our said process we take off the cap (*e*) and put into the vessel (*a*) the required quantity of flour and the previously mixed salt and water and then put on the cap and exhaust the vessel of atmospheric air and then open the connection with the gasometer that the gas may be forced in under heavy pressure and then put the shaft in motion that the blades on the shaft and vessel may thoroughly mix the ingredients. The continued rotation of the shaft causes the blades to thoroughly mix the flour with the water and to work the dough, which thus becomes charged with gas under heavy pressure. When the operator is under the impression that the dough has been sufficiently worked and charged with gas he has only to open the cock or valve of the discharge pipe (*c*) and the pressure inside will force out some of the dough for inspection. If it has not been sufficiently worked the cock or valve is to be reclosed and the working continued; but if sufficiently worked as the dough is forced out of the discharge pipe by the pressure inside the operator cuts it off in pieces of the required size to form loaves, cakes, &c., which are immediately put into the oven to bake, thereby avoiding the necessity of handling the dough after it is relieved of the surrounding pressure, which handling would cause the gas to be discharged without producing the required leavening effect. As the dough is thus mixed and worked it becomes thoroughly charged with gas and so soon as it is discharged from the vessel (a) and its exterior surface thereby relieved of the pressure under which it was mixed the inclosed compressed gas expands and in expanding swells it (the dough) and continues to swell it under the action of the heat in the oven during the process of baking, thereby leaving the bread thoroughly raised or leavened.

It is obvious from the foregoing that any desired degree of lightness may be imparted to the dough by regulating the degree of pressure under which it is mixed, and although we have stated that a soda water apparatus may be used for containing and supplying the carbonic acid gas as a means of producing the required pressure in the process of mixing the dough and we have also described a construction of apparatus for mixing the dough under pressure we do not wish to be understood as limiting our invention to the use of such special means as it will be obvious that any other apparatus for supplying the gas and for mixing dough or paste under gaseous pressure in a closed vessel may be substituted, and although we have found it more convenient to introduce the water and gas separately it will be obvious that the water previously charged with carbonic acid gas may be introduced instead; but in that case care should be taken to exhaust the atmospheric air from the vessel (a) and charge it with carbonic acid gas under sufficient pressure to prevent the escape of gas from the charged water as it is being forced into and mixed with the flour, &c., in the vessel, and it will also be obvious that instead of carbonic acid gas any other gas which is not deleterious may be substituted, although we have given the preference to carbonic acid gas, having found it to produce the best results.

What we claim as our invention and desire to secure by Letters Patent is—

1. The process of preparing dough or paste for making bread, cakes, or other farinaceous articles of food by mixing the materials with gas under pressure in a closed vessel substantially as described as a means of leavening or raising the same as set forth.

2. And we also claim discharging the dough as aforesaid from the vessel by the gaseous pressure as it is required substantially as and for the purpose specified.

JAMES PERRY.
ELISHA FITZGERALD.

Witnesses:
WM. H. BISHOP,
JOEL B. WILSON.